United States Patent
Kull et al.

(10) Patent No.: US 7,993,070 B2
(45) Date of Patent: Aug. 9, 2011

(54) QUICK DISCONNECT BALL SOCKET END FITTING

(75) Inventors: James T. Kull, Denver, NC (US); Brian M. Waypa, Charlotte, NC (US); Joshua S. McNair, Charlotte, NC (US); Rodney A. Armstrong, Belmont, NC (US)

(73) Assignee: Stabilus GmbH, Koblenz (DE)

( * ) Notice: Subject to any disclaimer, the term of this patent is extended or adjusted under 35 U.S.C. 154(b) by 450 days.

(21) Appl. No.: 12/195,172

(22) Filed: Aug. 20, 2008

(65) Prior Publication Data

US 2010/0047012 A1   Feb. 25, 2010

(51) Int. Cl.
*F16D 1/116* (2006.01)

(52) U.S. Cl. ...... 403/316; 403/122; 403/329; 296/146.8

(58) Field of Classification Search ............. 403/315, 403/316, 122, 321, 326, 329; 296/106, 146.8; 49/339, 344
See application file for complete search history.

(56) References Cited

U.S. PATENT DOCUMENTS

| | | | |
|---|---|---|---|
| 1,938,860 A | | 6/1932 | Renfer |
| 3,856,422 A | * | 12/1974 | Trefry .......................... 403/122 |
| 4,268,018 A | | 5/1981 | Langanke |
| 4,311,405 A | * | 1/1982 | Hawley .......................... 403/142 |
| 4,520,546 A | * | 6/1985 | Darnell .......................... 403/122 |
| 4,895,472 A | * | 1/1990 | Dony et al. .................. 403/315 |
| 5,833,383 A | * | 11/1998 | Bauman ........................ 403/122 |
| 7,124,864 B2 | | 10/2006 | Jones et al. |
| 2007/0253765 A1 | * | 11/2007 | Knopp et al. ................. 403/122 |

FOREIGN PATENT DOCUMENTS

| | | |
|---|---|---|
| GB | 323976 | 1/1930 |
| GB | 667073 | 2/1952 |

* cited by examiner

*Primary Examiner* — Michael P Ferguson
(74) *Attorney, Agent, or Firm* — Cohen Pontani Lieberman & Pavane LLP

(57) ABSTRACT

A coupling member for pivotally coupling an end of a device to a mounting ball includes a body connectable to an end of the device and defines a socket for receiving a mounting ball. The body further includes slots communicating with the socket. A sliding element arranged in a longitudinal groove of the body is movable from a first position to a second position. A C-shaped spring has two ends and a center section, the ends being received through the slots and projecting into the socket for holding the mounting ball in the socket. The sliding element interacts with the center section of the spring when the sliding element is moved to the second position so that the ends of the spring are drawn out from the socket to release the mounting ball from the socket, whereby the mounting ball is releasable from the socket without external tools.

13 Claims, 3 Drawing Sheets

QUICK DISCONNECT BALL SOCKET END FITTING

BACKGROUND OF THE INVENTION

1. Field of the Invention

The present invention relates to a quick disconnect ball socket end fitting, specifically for an end of a piston-cylinder unit.

2. Description of the Related Art

Piston-cylinder units used to facilitate opening and closing of vehicle hatches are mounted on ball assemblies on the vehicle body and the hatch. This type of connection allows pivotal movement of the piston-cylinder unit relative to the vehicle and the hatch during opening and closing of the hatch. Socket connectors for ball and socket connections use a C-shaped spring in which the ends of the C-shaped spring lock the ball in the socket. The bodies of known ball and socket connections include a recess allowing insertion of a prying tool for lifting the spring to release the ball from the socket. Thus, releasing of the socket connection in these known devices requires a separate tool. Furthermore, the design of the piston-cylinder unit must account for access of the prying tool.

A need exists for a ball and socket connection that allows easy release of the connection without an external tool.

SUMMARY OF THE INVENTION

An object of the present invention is to provide a ball and socket connector that is easy to release.

Another object of the present invention is to provide a ball and socket connector with a self-contained release mechanism.

These objects are met by a coupling member for pivotally coupling an end of a device to a mounting ball which includes a body connectable to an end of the device and defining a socket for receiving a mounting ball, the body having slots communicating with the socket, and a sliding element arranged in a longitudinal groove of the body. The sliding element is movable from a first position to a second position in the longitudinal groove. The coupling member further includes a C-shaped spring having two ends and a center section disposed between the two ends. The ends of the spring are received through the slots and project into the socket for holding the mounting ball in the socket. The sliding element interacts with the center section of the spring when the sliding element is moved to the second position so that the ends of the spring are drawn out from the socket to release the mounting ball from the socket, whereby the mounting ball is releasable from said socket without external tools.

For this purpose, the sliding element is wedge-shaped and comprises an inclined surface having a proximal end and a distal end. The inclined surface of the sliding element interacts with the center section of the spring by raising the center section of the spring when the sliding member moves to the second position. The sliding member further comprises a stop disposed at the distal end of the inclined surface. The spring abuts the stop when the sliding element is at the second position to prevent the center section of the spring from sliding over the distal end of the inclined surface and for preventing the sliding element from being inadvertently removed from the mounting member. The proximal end of the sliding element is at least partially under the center of the spring when the sliding member is in the first position.

In one embodiment of the present invention, the resiliency of the spring acts on the inclined surface and urges the sliding member toward the first position. Accordingly, when a user lets go of the sliding member at the second position, the sliding member is automatically moved back to the first position.

In an alternative embodiment, the sliding element is maintained at the second position when no actuating forces are applied to the sliding element. The sliding element further comprises a flat portion at the distal end of the inclined surface. The spring rests on the flat portion when the sliding element is in the second position.

The groove in which the sliding member is arranged includes a lateral slot in at least one side of the groove. The sliding member includes a corresponding lateral projection which is received in the slot to prevent the sliding member from being lifted out of or falling out of the groove.

The sliding member comprises a proximal end and a distal end relative to the spring. The distal end is digitally acuatable, i.e, by a user's finger, to move the sliding member from the first position to the second position, whereby removal of said coupling member from said ball may be accomplished by a one-hand operation.

The sliding member and the body are preferably made of corrosion-resistant material.

In a further embodiment, the spring includes stops limiting the length of insertion of each of said ends through the slots.

In a specific embodiment, the sliding member moves in a direction approximately parallel to a longitudinal axis of the body. The socket opens on a side of the body facing away from the sliding member such that a longitudinal axis of the socket is approximately perpendicular to the longitudinal axis of said body.

The object is also me by a piston-cylinder unit having the inventive coupling member arranged at least on one end thereof.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings.

In the drawings, wherein like reference characters denote similar elements throughout the several views.

DETAILED DESCRIPTION OF THE PRESENTLY PREFERRED EMBODIMENTS

Figure 1:
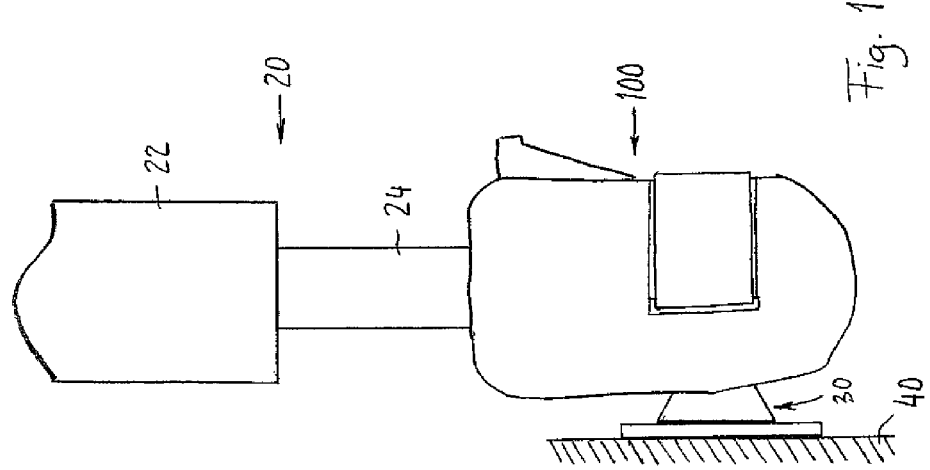
FIG. 1 is a side view of a piston cylinder unit with a coupling member according to an embodiment of the present invention.

FIG. 1 shows one end of a device 20 to be mounted to a ball assembly. The device to be mounted is a piston-cylinder unit which includes a cylinder 22 and a piston rod 24. A free end of the piston rod 24 is connected to a coupling member 100 which is coupled to a ball assembly 30 mounted on a fixed or movable support 40. The free end of cylinder 22 (not shown in FIG. 1) may be connected to a similar coupling member 100 for connection to a further ball assembly on a fixed or movable support. Although the embodiment of FIG. 1 shows a piston-cylinder unit, the present invention may be used to pivotally connect any device to a ball assembly.

Figure 2:
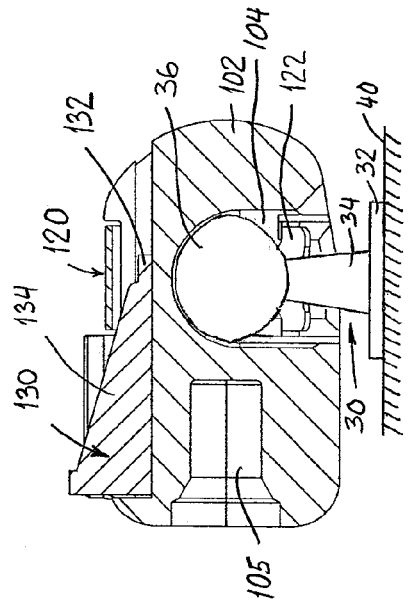
FIG. 2 is a longitudinal sectional view of an embodiment of the coupling member of the present invention with a sliding element in a first position.
Figure 3:
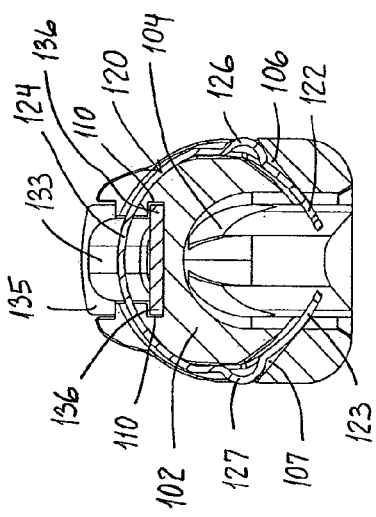
FIG. 3 is a lateral sectional view of the coupling member of FIG. 2.
Figure 4:
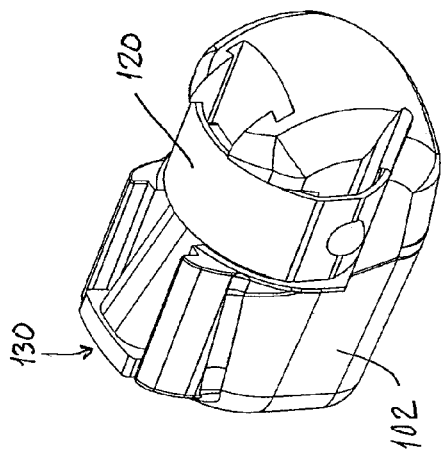
FIG. 4 is a perspective view of the coupling member of FIG. 1.

Referring to FIGS. 2 and 3, the ball assembly 30 includes a base 32, a post 34, and a ball 36 mounted on the post 34. A body 102 of the coupling member 100 defines a socket 104 in which the ball 36 is received and a threaded bore 105 providing a connection for the device 20. A longitudinal axis of the threaded bore 105 is approximately parallel to a longitudinal axis of the body 102. The longitudinal axis of the socket 104 is approximately perpendicular to the longitudinal axis of the body 102.

A C-shaped spring 120 having two ends 122, 123 and a center section 124 is mounted on the body 102. The ends 122, 123 are received through respective slots 106, 107 which communicate with the socket 104. The ends 122, 123 project into the socket 104 to lock the ball 36 in the socket as shown in FIG. 3. The C-shaped spring 120 further includes bulges 126, 127 disposed on the spring at predetermined distances from the respective ends 122, 123 of the spring. The bulges 126, 127 act as stops to prevent the ends 122, 123 from being inserted too far into the slots 106, 107 during handling or shipping of the coupling member 100 prior to use, i.e., the bulges facilitate keeping the spring 120 in a symmetrical position relative to the socket 104.

Figure 5:
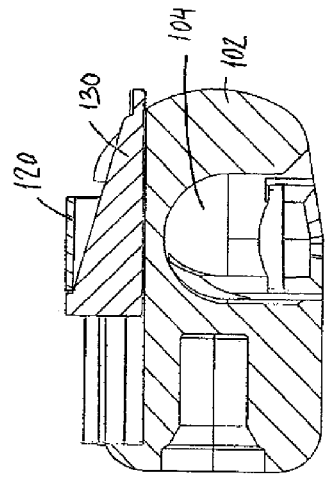
FIG. 5 is a longitudinal sectional view of the coupling member of FIG. 1 with the sliding member in a second position.
Figure 6:
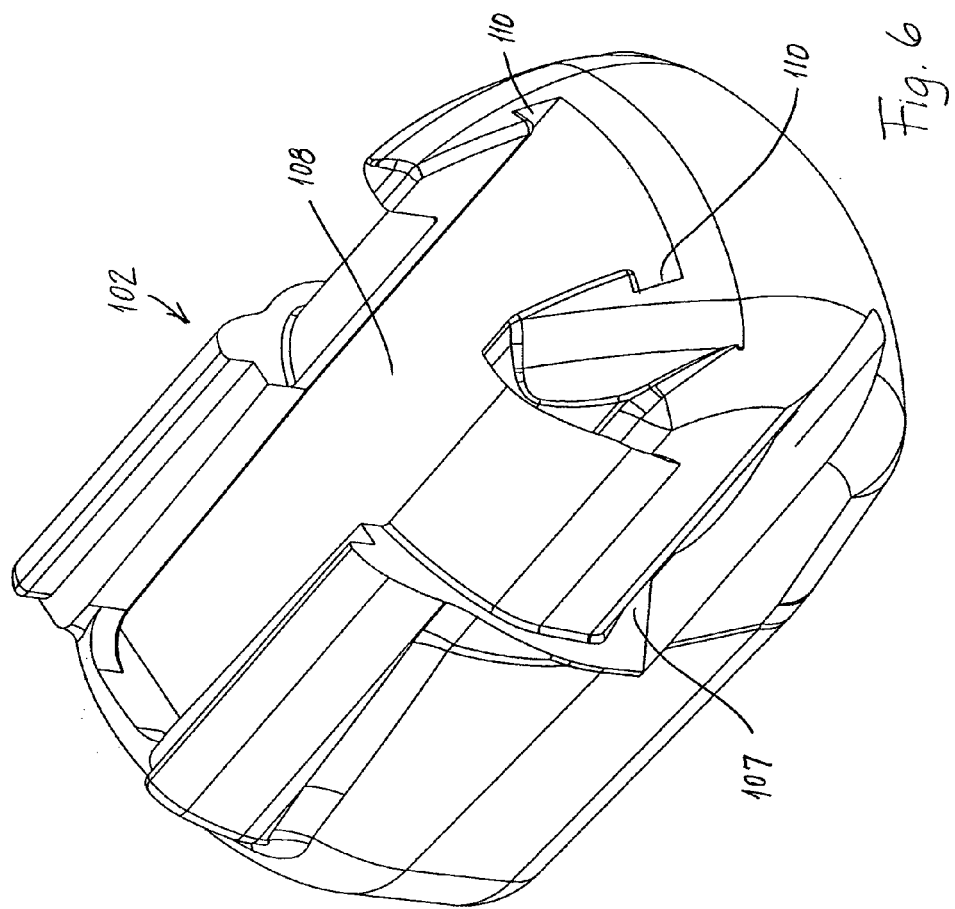
FIG. 6 is a perspective view of a body of the coupling member of FIG. 1.

As shown is FIG. 6, a sliding element 130 is arranged in a groove 108 defined in the body 102 and is movable relative to the body between a first position and a second position. In the first position of the sliding element 130, shown in FIG. 2, the spring 120 is in a locked position wherein the ends 122, 123 lock the ball 36 in the socket 104. When the sliding member 130 is pushed to the second position shown in FIG. 5, the spring 120 is raised so that the ends 122, 123 of the spring are sufficiently withdrawn from the socket 104 to allow removal of the coupling member 100 from the ball assembly 30.

Figure 7:
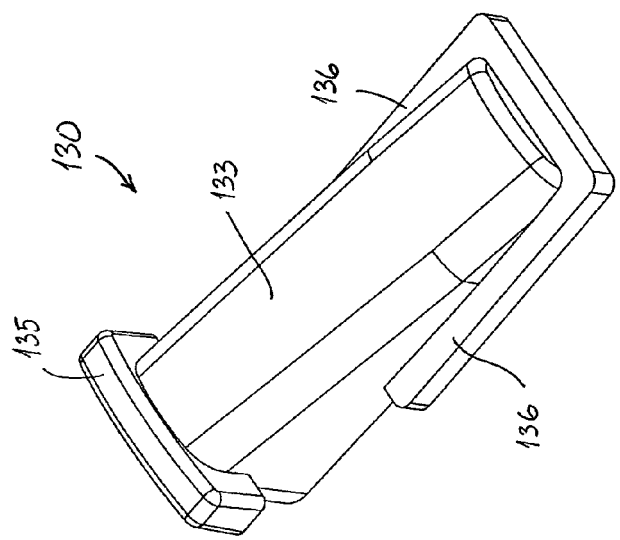
FIG. 7 is a perspective view of the sliding member of the coupling member of FIG. 1.

As show in FIG. 7, the sliding element 130 includes a base portion 132 and a wedge-shaped portion 134. The base portion 132 includes lateral projections 136 which engage lateral slots 110 in the groove 108. The engagement of the projections 136 in the slots 110 prevents inadvertent removal of the sliding element 130 from the groove 108. As shown in FIG. 2, a proximal end 131 of the sliding member 130 is disposed at least partially under the center section 124 of the spring 120 when the sliding element 130 is in the first position. As the sliding element 130 is moved toward the second position, an inclined surface 133 on the wedge-shaped portion 134 of the sliding member urges the center portion 124 of the spring 120 upward. The distal end of the sliding element 130 includes a stop 135 which includes a surface that abuts the spring 120 in the second position to prevent the sliding element 130 from moving past the second position (see FIG. 5). The top and rear surface of the stop 135 also provide a surface which an operator uses to push the sliding member 130 between the first and second positions.

Figure 8:
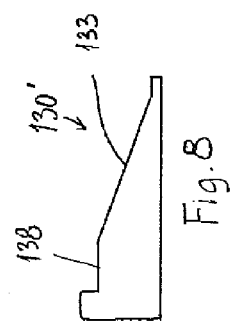
FIG. 8 is a side view of another embodiment of a sliding member of the present invention.

The sliding element 130 and the base 102 are preferably made of a non-corrosive material such as plastic. Although plastic is mentioned, any known or hereafter developed material that is non-corrosive in the intended environment of use may be used. The use of the sliding element 130 obviates the requirement of an external tool to disconnect the coupling member 100 from a ball assembly. The sliding element 130 is digitally actuatable, i.e., movable by a user's finger, from the first position to the second position. In one embodiment, the tension of the spring 120 against the including surface 133 when the sliding element 130 is in the second position urges the sliding element 130 back to the first position. In an alternative, a user must move the sliding element from the second position back to the first position. The advantage of the first embodiment is that the sliding element automatically enters the locked position when the user lets go of the sliding member. However, in some applications a more complex manipulation of the device to be mounted may be required. The second embodiment allows the user to move the sliding element to the second position and maintain the sliding element in the second position without holding the sliding element so that the user's hand is free to manipulate the coupling member and the device to be mounted. Once the ball 36 is received in the socket, the user can lock the ball in the socket by moving the sliding member to the first position. A sliding element 130' which maintains the second position is shown in FIG. 8. The sliding element 130' includes a flat area 138 at the distal end of the inclined surface 133 on which the spring 120 rests in the second position.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A coupling member for pivotally coupling an end of a device to a mounting ball, comprising:
    a body connectable to the end of the device and defining a socket for receiving a mounting ball, said body having slots communicating with said socket;
    a sliding element arranged in a longitudinal groove of said body, said sliding element movable in a longitudinal direction of said groove from a first position to a second position in said groove, said sliding element having a first surface facing the body and a second surface facing away from said body; and
    a C-shaped spring having two ends and a center section between said two ends, wherein said ends of said spring are received through said slots and project into said socket for holding the mounting ball in said socket, said sliding element interacts with said center section of said spring when said sliding element is moved to said second position such that said sliding element is between said body and said C-shaped spring and said second surface of said sliding element contacts a side of the center section of said C-shaped spring facing said body so that said ends of said spring are drawn out from said socket to release the mounting ball from said socket, whereby the mounting ball is releasable from said socket without external tools, wherein said sliding element is wedge-shaped and said second surface comprises an inclined surface having a proximal end and a distal end, said inclined surface interacting with said side of the center section of the C-shaped spring facing said body to move said center section of said C-shaped spring away from said body when said sliding element moves to the second position.

2. The coupling member of claim 1, wherein said sliding element further comprises a stop at said distal end of said inclined surface configured to prevent the center section of said spring from sliding over said distal end of said inclined surface.

3. The coupling member of claim 1, wherein said proximal end of said sliding element is at least partially under said center of said spring when said sliding element is in said first position.

4. The coupling member of claim 1, wherein said resiliency of said spring urges said sliding element toward said first position.

5. The coupling member of claim 1, wherein said groove is defined by a bottom surface and two sidewalls in said body, said groove further including a lateral slot in at least one of said sidewalls, said sliding element member including a lateral projection received in said slot to prevent said sliding element from exiting said groove.

6. The coupling member of claim 1, wherein said sliding element comprises a proximal end and a distal end relative to said spring, said distal end being digitally acuatable to move said sliding element to said second position, whereby removal of said coupling member from said ball is accomplished by a one-hand operation.

7. The coupling member of claim 1, wherein said sliding element and said body are made of corrosion-resistant material.

8. The coupling member of claim 1, wherein said spring includes stops limiting the length of insertion of each of said ends through the slots.

9. The coupling member of claim 1, wherein said sliding element moves in a direction approximately parallel to a longitudinal axis of said body.

10. The coupling member of claim 9, wherein said socket opens on a side of said body facing away from said sliding member such that a longitudinal axis of said socket is approximately perpendicular to said longitudinal axis of said body.

11. The coupling member of claim 1, wherein said sliding element is maintained at said second position when no actuating forces are applied to said sliding element.

12. The coupling member of claim 1, wherein said sliding element further comprises a flat portion at the distal end of said inclined surface on which said spring rests when said sliding element is in the second position.

13. A piston-cylinder unit having a cylinder and a piston rod projecting from an end of said cylinder, and a coupling member for coupling said piston-cylinder unit to a ball assembly, said coupling member being connected to one of said cylinder and said piston rod and comprising:

a body connectable to an end of said piston-cylinder unit and defining a socket for receiving a mounting ball, said body having slots communicating with said socket;

a sliding element arranged in a longitudinal groove of said body, said sliding element movable in a longitudinal direction in said groove from a first position to a second position in said groove, said sliding element having a first surface facing said body and a second surface facing away from said body; and a C-shaped spring having two ends and a center section between said two ends, wherein said ends of said spring are received through said slots and project into said socket for holding the mounting ball in said socket, said sliding element interacts with said center section of said spring when said sliding element is moved to said second position such that said sliding element is between said body and said C-shaped spring and said second surface of said sliding element contacts a side of said center section of said C-shaped spring facing said body so that said ends of said spring are drawn out from said socket to release the mounting ball from said socket, whereby the mounting ball is releasable from said socket without external tools, wherein said sliding member is wedge-shaped and said second surface comprises an inclined surface having a proximal end and a distal end, said inclined surface interacting with the side of said center section of said C-shaped spring facing said body causing said center section of the C-shaped spring to move away from the body when the sliding element moves to the second position.

* * * * *